United States Patent [19]

Iwai et al.

[11] Patent Number: 4,710,806

[45] Date of Patent: Dec. 1, 1987

[54] DIGITAL DISPLAY SYSTEM WITH COLOR LOOKUP TABLE

[75] Inventors: Shinichi Iwai, Kawasaki; Sakae Uno, Hachiohji, both of Japan

[73] Assignee: International Business Machines Corporation, Armonk, N.Y.

[21] Appl. No.: 877,910

[22] Filed: Jun. 24, 1986

[30] Foreign Application Priority Data

Jul. 4, 1985 [JP] Japan .................. 60-145879

[51] Int. Cl.[4] .................. H04N 1/46

[52] U.S. Cl. .................. 358/81; 340/703; 358/78; 364/521

[58] Field of Search .................. 358/81, 80, 76, 78; 340/703; 364/521

[56] References Cited

U.S. PATENT DOCUMENTS

| | | | |
|---|---|---|---|
| 4,183,046 | 1/1980 | Dalke | 358/81 |
| 4,232,311 | 11/1980 | Agneta | 358/81 |
| 4,574,393 | 3/1986 | Blackwell | 358/81 |
| 4,580,135 | 4/1986 | Kummer | 340/703 |
| 4,580,782 | 4/1986 | Ochi | 364/521 |
| 4,633,416 | 12/1986 | Walker | 364/521 |

*Primary Examiner*—Howard W. Britton

[57] ABSTRACT

A digital display system includes a frame buffer store containing picture element data which is read out to address a color lookup table from which color data is read to a display device. The color lookup table comprises a first area storing color data common to a plurality of images and further areas each storing color data related to a corresponding one of the images. Data in the first area is generated by uniformly sampling a color space, data in the further areas is generated by sampling and quantizing input image data.

4 Claims, 8 Drawing Figures

CLT 16.

QUANTIZATION ALGORITHM

CALCULATION OF CHROMATICITY (θ, φ)

EXTRACT COLORS ARROUND PEAK (a)

(b)

CHROMATICITY HISTOGRAM

CALCULATION OF REP COLORS

DIGITAL DISPLAY SYSTEM WITH COLOR LOOKUP TABLE

FIELD OF THE INVENTION

The present invention relates to digital display systems and in particular to such systems that employ a color lookup table to provide color representing digits to a display device.

BACKGROUND TO THE INVENTION

Digital display systems with color lookup table architecture are now quite common. The number of colors provided by a color lookup table system is equal to the number of registers in the system. Although it is advantageous in the fields of animation and image processing to increase the number of colors, the capacity of the color lookup table must be increased, which leads to the rise of cost. However, since image quality lowers if the number of colors is decreased, there is a tradeoff between the cost and image quality. Therefore, the problem is how to display color images effectively using a color lookup table of a limited capacity, in other words, which colors should be stored in the color lookup table.

A number of studies on the method of selecting colors stored in the color lookup table have been carried out, and these may be roughly divided into uniform sampling and tapered or adaptive sampling techniques. Uniform sampling is a method for sampling a color space such as RGB space, XYZ space, HLS space or L*u*v* space at equal intervals.

In this context, colors are represented by triplets, such as red, green and blue components and each color can then be defined by coordinates of a three dimensional space, or color space. The RGB space is that defined by red, green and blue components. The XYZ space is a space in which the entire spectrum of visible light can be represented by positive values of coordinates X, Y and Z. The HLS space is one in which each color is defined by hue, saturation and lightness coordinates. The L*u*v space is one in which the coordinates are defined such that the coordinate values correspond linearly with human color perception. XYZ and L*u*v spaces are described in more detail in "Uniform Color Scale Applications to Computer Graphics" by J. Tajima, which appeared in COMPUTER VISION, GRAPHICS, AND IMAGE PROCESSING, Vol. 21, No. 3, pp. 305–325, March 1983.

In adaptive sampling, the content of the table is changed depending on images to be displayed. A process for color image quantization by adaptive sampling is described below. It is assumed that the color space is the RGB space.

(1) Create a histogram by sampling an input image having n bits for each of the R, G and B components in a space having n bits for each of the R, G and B components where m is larger than n. The reason for the difference between m and n is that, though the space may be defined with high precision, related to m bits (e.g. 8 bits per primary color), the histogram can not be efficiently produced with this precision, so is calculated using n bits (e.g. 4 bits per primary color) by taking the n most significant bits of each m bit group.

(2) Select colors (representative colors) to be stored in the color lookup table from the histogram figures.

(3) Map each selected color in the RGB space into the lookup table.

(4) Assign to each pixel an appropriate color in the table.

The steps which greatly affect the quality of displayed images are (2) and (4). In step (3), calculation speed is important. In step (4), if the mapping calculated in step (3) is used as it is, clear stripes are often seen in the region where colors vary smoothly, due to the quantization error. In order to decrease the quantization error, various methods such as the random noise method and error diffusion method have been developed. For step (2), some algorithms such as the popularity algorithm in which representative colors are selected from the histogram in order of frequency, and population equalization algorithm in which the RGB space is divided into a plurality of subspaces corresponding to available representative colors, respectively, each subspace containing the same number of pixels. The former and latter algorithms are disclosed in P. Heckbert, "COLOR IMAGE QUANTIZATION FOR FRAME BUFFER DISPLAY", ACM SIGGRAPH '82, pp. 297–307, July 1972, and Japanese Patent Application No. 59-84259, respectively.

Although the color image quantization methods heretofore proposed have been satisfactory when only one image is displayed, there are some problems if a plurality of images are to be displayed simultaneously on a screen, because different images usually use different colors. For example, if colors to be stored in the color lookup table are selected by uniform sampling, a difference between a color of the original image and a color actually displayed is relatively small, but clear stripes appear in a region with a uniform chromaticity and smoothly varying brightness. In the case of adaptive sampling, since a plurality of images are processed collectively, the whole table must be rewritten each time an image is changed. Furthermore, in adaptive sampling, since frequently used colors are selected, a color of lower frequency may differ greatly from a color actually displayed.

DISCLOSURE OF THE INVENTION

In accordance with the present invention, a color lookup table is divided into a shared area which is shared by a plurality of color images, and a plurality of dedicated areas corresponding to the respective color images. In the shared area, colors which can be used by each image in common are stored while in each dedicated area, appropriate colors for the corresponding image are stored.

In an embodiment of this invention, the colors stored in the shared area are selected by uniform sampling of a given color space (e.g. RGB space), and the colors stored in each dedicated area are selected by adaptive sampling of a corresponding image. In the case of adaptive sampling, frequently used colors are selected, and additional colors are also selected based on brightness from a chromaticity group including a larger number of pixels than a predetermined value.

DETAILED DESCRIPTION

Although this invention may be implemented in any color space, it will be described using the RGB space as an example, which is easiest to understand.

Figure 1:
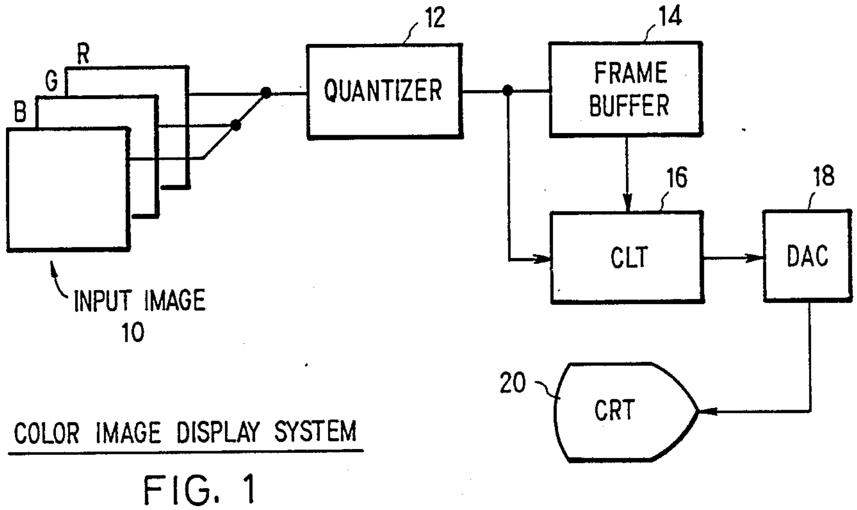
FIG. 1 is a block diagram of a digital color display system in which the present invention can be employed.

FIG. 1 shows a color image display system embodying the invention. An input image 10 to be displayed on a color CRT 20 is supplied from an image file or a scanner (both not shown), and each pixel thereof is represented by n (e.g. 8) bits for each of R, G and B. The pixel data is sent to a quantizer 12 to select representative colors for display and to write display addresses in a frame buffer. Quantizer 12 processes all the pixel data of the input image 10 twice. First, this data is processed to select the representative colors to be written in a CLT (color lookup table) 16, and then it is further processed to calculate and write in the frame buffer 14, for each pixel, encoded data for accessing the CLT 16. Details of the configuration and operation of the quantizer 12 will be described later.

As is well known in the art, locations in the frame buffer 14 correspond to dot pixel positions on a CRT screen. In this embodiment, it is assumed that pixel data to be written in each location of the frame buffer 14 consists of eight bits. Therefore, the capacity of the CLT 16 accessed by such a pixel data is 256 words. In other words, 256 representative colors can be stored in the CLT 16. Each color is assumed to be expressed by twelve bits (for bits for each of R, G and B as, in other words, each CLT location is twelve bits long. The maximum number of display colors is, therefore, 4096. It is noted that these values are only for the purpose of description of the embodiments, and this invention is not limited to these values. Color data read from the CLT 16 addressed by eight bit pixel data in the frame buffer 14 is converted by a digital to analog converter (DAC) 18 into analog signals used to drive the CRT 20. Thus, a desired color image is displayed on the screen of the CRT 20.

Figure 2:
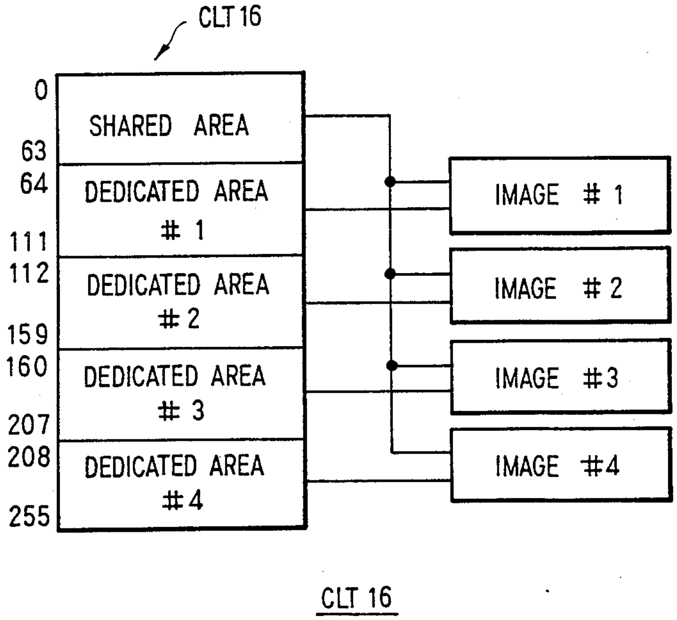
FIG. 2 shows mapping of a color lookup table in accordance with the invention.

FIG. 2 shows the configuration of the CLT 16 and relationship between the CLT 16 and each image. Unlike the conventional CLT's, the CLT 16 of this invention is logically divided into a shared area and a plurality of dedicated areas corresponding to the respective images. The shared area is used in common by a plurality of images displayed on the CRT 20. Each of the dedicated areas is used only by a corresponding image. In this embodiment, the shared area contains 64 predetermined colors, and each dedicated area contains 48 colors which may be changed by the quantizer 12. Therefore, each image can use up to 112 (64+48) colors. If the capacity of the CLT 16 is 256 words, the number of the dedicated areas is four. In that case, the CRT 20 displays four color images. In FIG. 2, it should be noted that lines between each area of the CLT 16 and images merely show the relationship therebetween and do not physically exist.

Next, a method for selecting the color data to be stored in the shared and dedicated areas will be described. Sixty-four colors to be stored in the shared area are determined by the uniform sampling of the RGB space. Since each representative color has four bits for each of R, G and B components, the decimal value of each component varies between 0 and 15 inclusive. The sixty-four representative representative color may be determined by selecting, for example, 0, 5, 10 and 15 from the possible decimal values. In that case, if each representative color is expressed by (R, G, B), they are (0, 0, 0), (0, 0, 5), (0, 0, 10), (0, 0, 15), (0, 5, 0), (0, 5, 5), . . . , (15, 15, 15).

Figure 3:
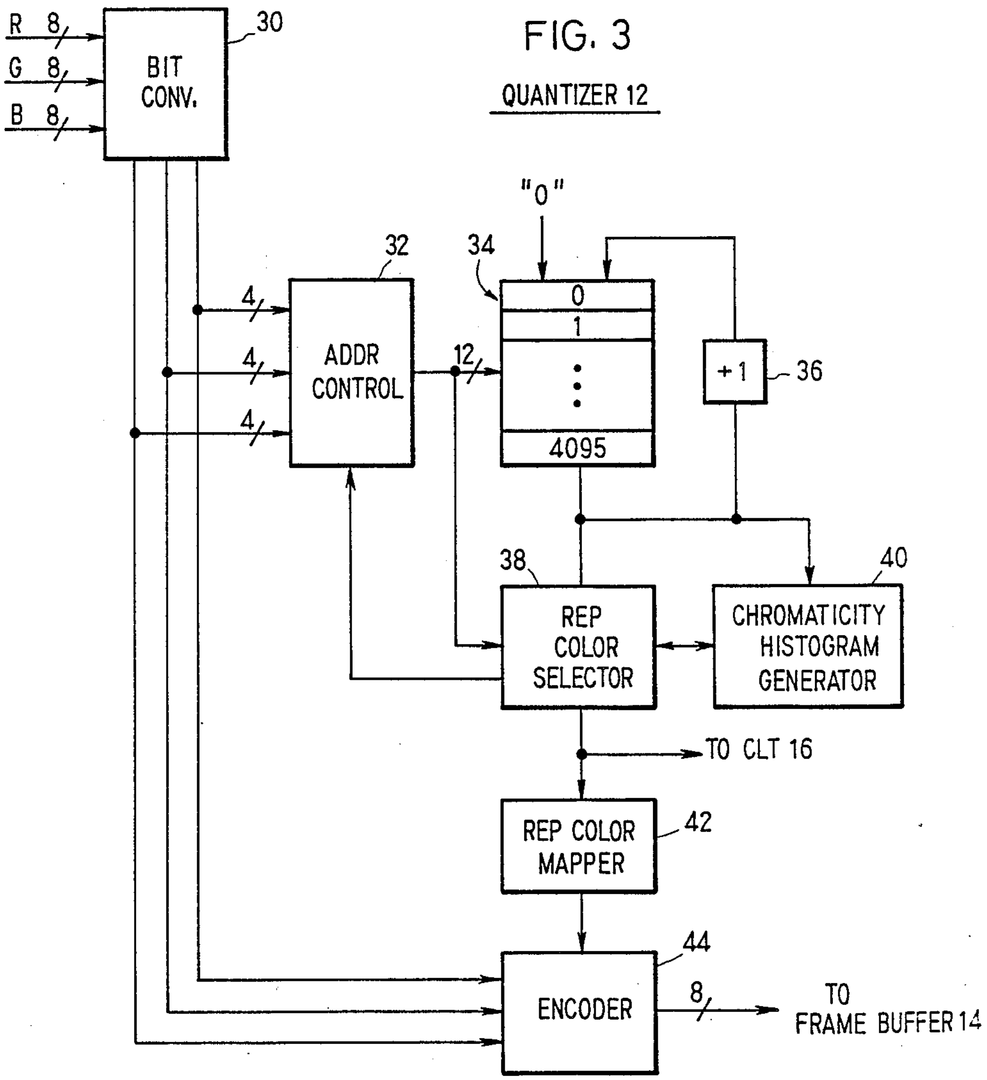
FIG. 3 is a block diagram of quantizer used in the FIG. 1 systems.
Figure 4:
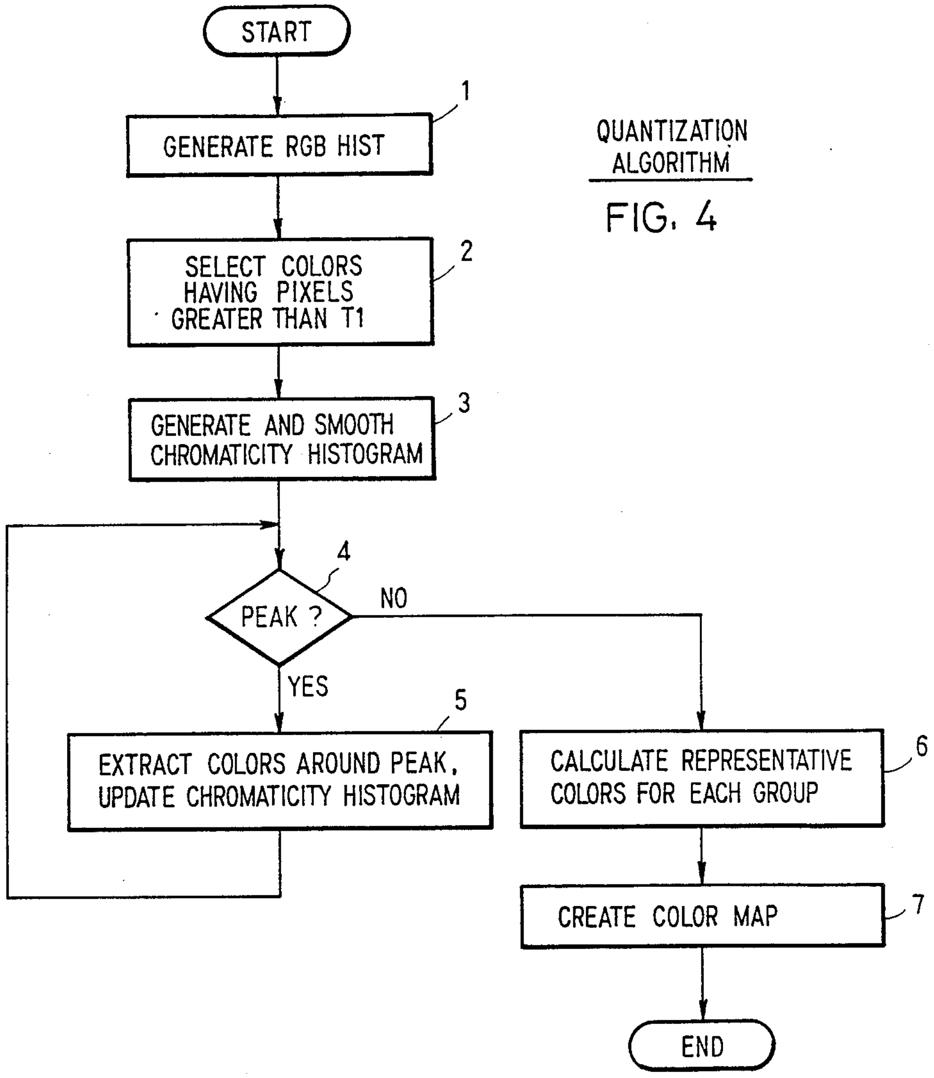
FIG. 4 is a flowchart of a quantizer algorithm.

The color data to be stored in the dedicated areas is selected by the quantizer 12 for each image. FIG. 3 shows the configuration of the quantizer 12, and FIG. 4 is a flow diagram of a quantization algorithm used by quantizer 12. As shown in FIG. 3, input pixel data comprising eight bits for each of R, G and B is converted to a pixel data of four bits for each of R, G. and B by a bit converter 30. The bit converter 30 outputs the higher four bits of the R, G and B components. An address control 32 uses the converted pixel data as a twelve bit address to access a count register array 34. The array 34 contains 4096 count registers, and the content of an addressed count register is incremented by one in an incrementing device 36 and written back in the same location. By repeating the above process for every pixel in an input image, the number of pixels of each color in an input image is determined.

The contents of the array 34 are read out to a representative color selector 38 and a chromaticity histogram generator 40 under the control of the address control 32. The representative color selector 38 selects up to 48 representative colors based on color distribution in the input image, and stores them in a dedicated area of the CLT 16 which corresponds to the input image involved. A representative color mapper 42 maps the colors in the RGB space (4096 colors in this embodiment) to the representative colors stored in the CLT 16. An encoder 44 encodes the pixel data with four bits for each of R, G and B components into an eight bit CLT address based on the map information from the representative color mapper 42, and writes it in the frame buffer 14.

Next, referring also to FIG. 4, the operation of the quantizer 12 will be described stepwise. The quantization is of the adaptive sampling type, and is performed for each image.

STEP 1

An RGB histogram (a graph showing relationship between colors and numbers of pixels) is generated in a space with four bits for each of R, G and B components from the input image. This is performed by the count register array 34 and the incrementing device 36 as described before. During step 1, the representative color selector 38, the chromaticity histogram generator 40, the representative color mapper 42 and the encoder 44 are all inactive.

STEP 2

Colors used in a great number of pixels, such as a background color, are selected as representative colors and then deleted from the histogram. This is to prevent a peak of chromaticities, which is to be detected in succeeding steps, from being biased to the chromaticity of the background color. Therefore, in FIG. 3, the representative color selector 38 is activated to receive the content of each count register sequentially read out under the control of the address control 32, and the associated twelve bit address. The representative color selector 38 compares the content of the count register, i.e. the number of pixels, with a threshold T1, explained below, and if the former is greater, it saves the twelve bit address received simultaneously as a representative color, and further informs the address control 32 of this saving. The address control 32 responds to it and resets the count register presently addressed to zero.

$$T1-(Pt/Ra)\ k1$$

In the above equation, Pt is the total number of pixels in the histogram, Ra is the number of remaining representative colors, and K1 is a constant. The initial value of Pt is determined by the resolution of the input image which is, for example, 262144 (512×512). The initial value of Ra is 48 in this embodiment as there are this number of colors in a dedicated area. Since (Pt/Ra) represents the average number of pixels per representative color, the above equation indicates that each color having a greater number of pixels than k1 times the average value is selected as a representative color. The constant k1 is fixed to a certain value, e.g. five. Pt and Ra may be either constants or variables. When they are handled as variables, each time the representative color selector 38 selects a representative color, it substracts the number of pixels of the selected color from Pt and substracts one from Ra. The above equation has been adopted considering a wide region of uniform chromaticity and brightness such as the background. However, any color already selected for the shared area is neglected even if it contains a greater number of pixels than T1.

STEP 3

Figure 5:
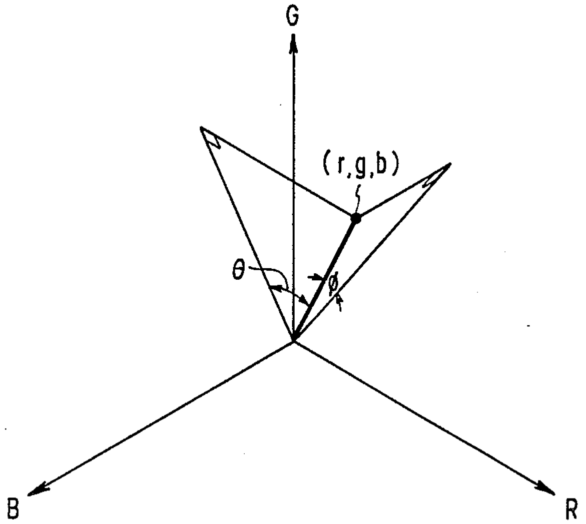
FIG. 5 is a diagram illustrating the calculation of chromaticity.

A chromaticity histogram is generated. Here, an RGB ratio is defined as a chromaticity. Referring to FIG. 5, the chromaticity is represented by angles $\theta$ and $\phi$ are calculated by the following equations:

$$\theta=\arcsin\,[r/(r^2+g^2+b^2)^{\frac{1}{2}}]$$

$$\phi=\arcsin\,[b/(r^2+g^2+b^2)^{\frac{1}{2}}]$$

Although each of $\theta$ and $\phi$ may take a value between 0° and 90° inclusive, $\theta+\phi$ never exceeds 90° as can be see from FIG. 5. When the chromaticity histogram is generated, the ranges of $\theta$ and $\phi$ are equally divided into c subranges (e.g. 25 subranges), and the number of pixels falling within each subrange is determined.

Figure 6:
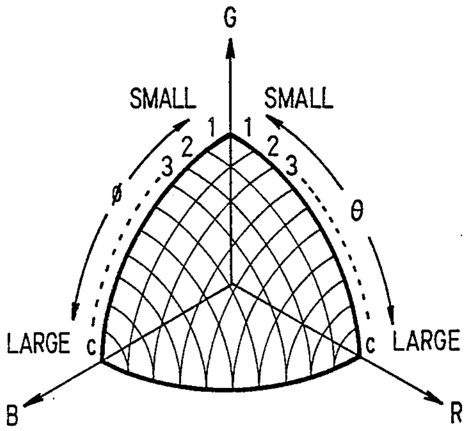
FIG. 6 shows a chromaticity histogram.
Figure 6:
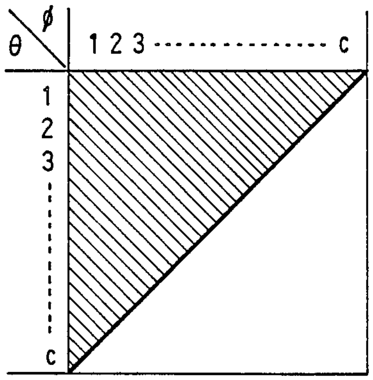

FIG. 6 (*a*) shows the division in the RGB space, and FIG. 6 (*b*) shows it in a matrix form. Once the maximum number of colors displayed (4096 in this embodiment) is determined, $\theta$ and $\phi$ of each of the colors are uniquely identified so that each count register in the array 34 shown in FIG. 3 can previously be made to correspond to each subrange of $\theta$ and $\phi$, that is, each matrix element in the hatched area of FIG. 6 (*a*). Therefore, when the chromaticity histogram is generated, the chromaticity histogram generator 40 is activated to receive count values sequentially read out of the array 34 under the control of the address control 32. The chromaticity histogram generator 40 generates the chromaticity histogram by accumulating for each matrix element the contents of corresponding count resisters.

Next, the following mask is used on the histogram of the matrix form to smooth the numbers of pixels.

| | | |
|---|---|---|
| M | M | M |
| M | 1 | M |
| M | M | M |

M is a mask value between 0 and 1 inclusive. Here, M is assumed to be 0.5. When the above mask is used, its center is aligned with a value to be smoothed and the value is updated by adding thereto M times of each of its upper, lower, left, right, upper right, lower right, upper left and lower left values. This smoothed histogram is generated separately from the original chromaticity histogram, which remains as it is.

STEP 4

After the histogram consisting of the smoothed matrix elements has been generated, the representative color selector 38 selects as a peak a matrix element containing the maximum value among the smoothed values greater than the following threshold T2.

$$T2=(Pt/Ra)\ k2$$

The representative colors selected in step 2 have been removed from Pt and Ra. k2 is a constant, preferably equal to k1 in the previous equation. If k2 is made greater, the number of peaks selected decreases and, correspondingly, a larger number of colors are selected per peak.

STEP 5

In the RGB space, colors within the range of the following threshold T3 (radian) around the peak detected in step 4 are extracted. This is shown in FIG. 7.

$$T3=(0.5+M)\ \pi/2c$$

Figure 7:
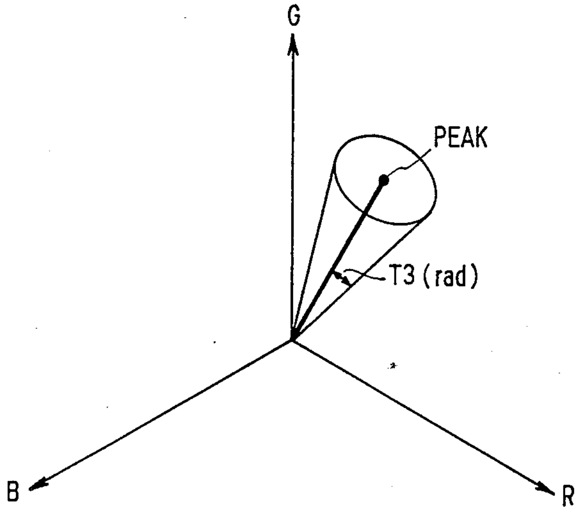
FIG. 7 illustrates the extraction of colors around a peak.

The peak position shown in FIG. 7 is assumed to be the center of a corresponding mesh in FIG. 6 (*a*). In the above equation, $\pi/2c$ approximates to the length of a side of a mesh. M is the mask value of step 3. If M=0.5 and c=25, then T3=$\pi/50$. If the values of M and c are fixed, the colors within the range of T3 can previously be obtained for each mesh of FIG. 6 (*a*). The representative color selector 38 is provided with a table of 325 meshes (matrix elements) and corresponding colors within the range of T3. When the selector 38 detects a peak, it fetches corresponding colors from the table and saves them as a group. The representative color selector 38 then transfers an identifier of the element detected as a peak to the chromaticity histogram generator 40 to update the chromaticity histogram. The chromaticity histogram generator 40 resets the identified element to zero in the original chromaticity histogram which has not been smoothed, and after subtracting the number of pixels of the colors which were within the range of T3 of the peak from surrounding elements, it performs smoothing again using the chromaticity histogram thus updated. In this time, only a portion related to the updated elements in the original chromaticity histogram is recalculated. After this, the procedure returns to step 4, and steps 4 and 5 are repeated until a peak greater than T2 is no longer detected.

STEP 6

The representative color selector 38 calculates the number of representative colors which is to be assigned to each group selected in step 5 using the following equation:

$$Ri = \left( Gi / \sum_{j=1}^{m} Gj \right) Ra$$

In the above equation, Ri is the number of representative colors which is to be assigned to the i-th group Gi is the number of pixels of the i-th group, Ra is the number of remaining representative colors, and m is the number of groups selected in step 5. The above equation shows that the number of representative colors which is to be assigned to each group is proportional to the number of pixels in the group involved. Although each number of pixels can be obtained from the count register array 34, the colors in the shared area are not included in the calculation.

When Ri has been obtained, the representative color selector 38 generates a histogram using an inner product of a vector, in the RGB space, of each color contained in the group involved and a unit vector in the peak direction. This histogram is generated by arranging the numbers of pixels sequentially in order of the inner product values. The table of meshes and extracted colors described above contains the inner product value for each extracted color, and the representative color selector 38 accesses this table to generate the histogram. Since the inner product here is obtained by projecting the vector of each color on the peak line, it corresponds to the brightness of each color.

The representative color selector 38 then selects a color (not in the shared area) having the greater number of pixels than hi (=Gi/Ri) in the inner product histogram as a representative color. hi is the average number of pixels per representative color in the group. After selecting a color, the representative color selector subtracts one from Ri and the number of pixels thereof from Gi to update hi. In this way, the selection of representative colors and updating of hi are repeated until a color having the greater number of pixels than the updated hi is no longer detected. However, if Ri is found to be zero before updating hi, the selection of representative colors is stopped.

If the number of representative colors selected in the above process is smaller than the initially calculated value of Ri, the representative color selector 38 selects one or more additional representative colors in the following manner.

Figure 8:
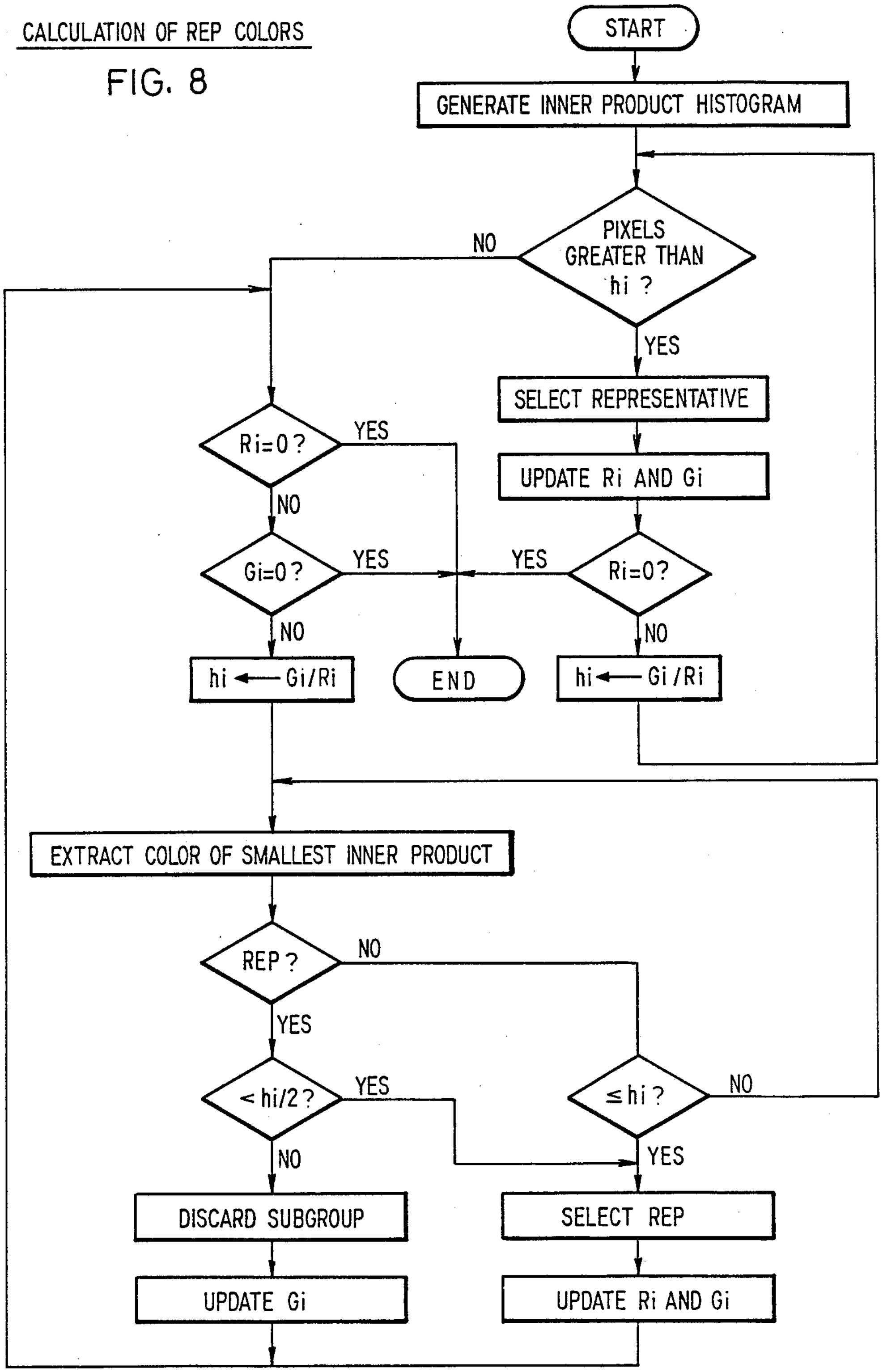
FIG. 8 is a flowchart of a color calculation algorithm.

In principle, a representative color is determined in each subgroup which is formed by grouping every hi pixel sequentially starting from the smallest inner product in the inner product histogram, i.e. the darkest color. If any representative color which has already been selected is encountered during the grouping, it is stopped immediately, and if the number of pixels in a current subgroup is equal to or smaller than hi/2, this subgroup is discarded. On the other hand, if the number of pixels is greater than hi/2, the subgroup involved is treated as an independent subgroup from which a representative color is selected. In this case the value of hi is also sequentially updated. When a representative color is selected in each subgroup, the average of group members is used. FIG. 8 shows the flow of step 6.

The representative color selector 38 writes the selected representative colors into a dedicated area in the CLT 16 corresponding to the input image involved, and informs the representative color mapper 41 of the representative colors and CLT addresses.

STEP 7

A table of the respective colors in the RGB space and corresponding representative colors stored in the CLT 16 (referred to as representative color map) is prepared. For this purpose, the representative color mapper 42 calculates distances between each color in the RGB space and the selected representative colors. At that time, since the colors for the shared area have been selected by the uniform sampling, a representative color always exists for any color within the following distance d therefrom.

$$d = [3(m/2s)^2]^{\frac{1}{2}}$$

The above equation assumes the case where s×s×s colors are distributed with a uniform interval in an m×m×m space. In this embodiment, since m=16 and s=4, d is approximately 3.5. Therefore, for each of the representative colors, only distances from colors within d are calculated and a representative color with the smallest distance is assigned to the relevant color. In this way, the representative color mapper 42 creates the representative color map containing as an entry the address of the CLT 16 for each of 4096 colors in the RGB space. Thereafter, the system scans the input image again and transmits the output of the bit converter 30 to the encoder 44 where the pixel data with four bits for each of R, G and B components is converted into the address of the CLT 16 by using the representative color map, and written in a corresponding location in the frame buffer 14. By repeating the above steps for each input image, a plurality of images can be displayed simultaneously with appropriate colors on the CRT 20.

While the invention has been shown and described with reference to a preferred embodiment thereof, it will be understood by those skilled in the art that various changes in form and detail may be made without departing from the spirit and scope of the invention.

We claim:

1. A digital display system comprising a frame buffer store, a color lookup table, means for accessing the color lookup table by data read from the frame buffer store to generate color data sequences for display on a display device, said table comprising a first area for storing color data common to a plurality of images and further areas each for storing color data different from the color data in said first area and relating to a corresponding one of said images, means for uniformly sampling a color space to generate the color data for said first area of said table, and quantizer means for adaptively sampling an input data image to generate the color data for the color lookup table area corresponding to that data image.

2. A digital display system according to claim 1 in which said quantizer means includes means for selecting color data from an input data image in accordance with frequency of occurrence of different picture element colors.

3. A digital display system according to claim 1 in which said quantizer means includes a count register array for recording the number of picture elements of each color of an input data image.

4. A digital display system according to claim 3 in which said quantizer means includes color selector means for selecting colors in accordance with the data in said count register array for transfer to said color lookup table.

* * * * *